United States Patent
Itou et al.

[11] Patent Number: 5,969,489
[45] Date of Patent: Oct. 19, 1999

[54] MOTOR DRIVING SYSTEM FOR DRIVING BRUSHLESS MOTOR

[75] Inventors: Satoshi Itou; Hiroshi Iwai, both of Fujieda, Japan

[73] Assignee: Victor Company of Japan, Ltd., Yokohama, Japan

[21] Appl. No.: 08/902,119

[22] Filed: Jul. 29, 1997

[30] Foreign Application Priority Data

Jul. 31, 1996 [JP] Japan ................................. 8-219249
Sep. 10, 1996 [JP] Japan ................................. 8-261385

[51] Int. Cl.[6] .......................... H02K 29/02; H02P 6/02
[52] U.S. Cl. ...................... 318/254; 318/439; 318/138
[58] Field of Search .................................. 318/138, 139, 318/245, 254, 439, 560, 561

[56] References Cited

U.S. PATENT DOCUMENTS 4,418,303 11/1983 Abe et al. .................................. 318/254
4,633,150 12/1986 Inaji et al. ................................ 318/254
4,658,190 4/1987 Miyazaki et al. ........................ 318/254
5,160,873 11/1992 Tukiyama et al. ....................... 318/254

FOREIGN PATENT DOCUMENTS 58-204791 11/1983 Japan .
2-114833 4/1990 Japan .

*Primary Examiner*—Paul Ip
*Attorney, Agent, or Firm*—Michael N. Meller

[57] ABSTRACT

A motor driving system for a brushless motor is comprised of a drive magnet, a rotor provided with the drive magnet and supported by the shaft, 3-phase stator coils provided on a substrate and facing to the drive magnet, two Hall elements exposed to magnetic fluxes of the drive magnet and outputting Hall signals having a 120 degrees phase difference, an amplitude control device for equalizing an amplitude difference between the Hall signals and outputting equalized Hall signals, a signal compounding device for compounding the equalized Hall signals and outputting a compound signal, a drive circuit for switching drive currents to be supplied to the 3-phase stator coils in response to the equalized Hall signals and the compound signal.

10 Claims, 12 Drawing Sheets

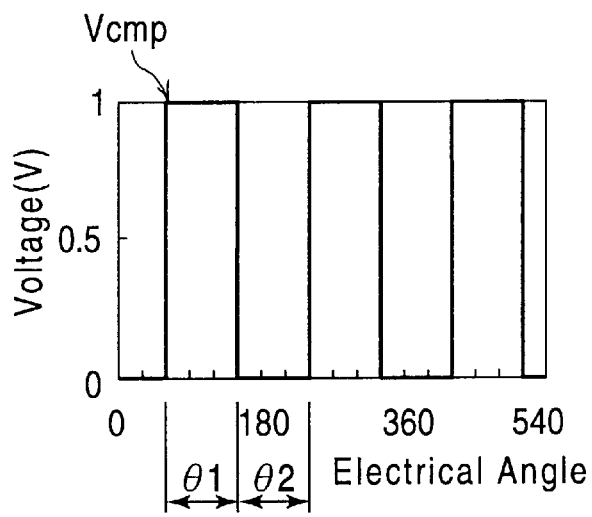
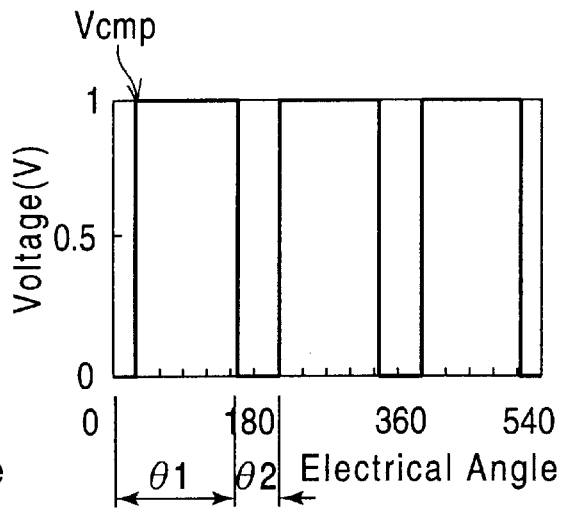
*Fig. 9(A)*  *Fig. 9(B)*
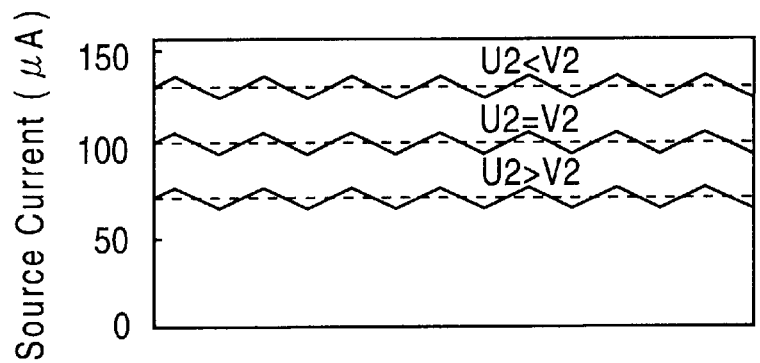
*Fig. 10*
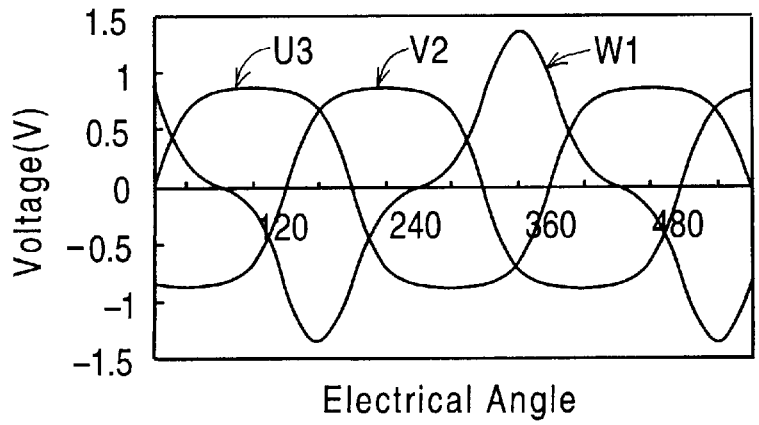
*Fig. 12*

MOTOR DRIVING SYSTEM FOR DRIVING BRUSHLESS MOTOR

BACKGROUND OF THE INVENTION

1. Field of the Invention

The present invention relates to a motor driving system for a brushless motor, in particular to an improvement of the motor driving system for a brushless motor suitable for a spindle motor of a video tape recorder (VTR), a disc memory device, and for a spindle motor for driving a polygon mirror.

2. Description of the Related Art

FIG. 5 shows a sectional side view of a brushless motor for driving directly a capstan shaft of a VTR.

FIG. 6 shows a plan view of a stator of the brushless motor shown in FIG. 5.

A rotor 30 is fixed to a shaft 40, a capstan shaft, which is held to rotate by a bearing 100 and a spindle 90. The rotor 30 is provided with a drive magnet 50, facing to a stator 20. The drive magnet 50 has eight magnetic poles magnetized in a form of sine-wave. Around the drive magnet 50, an FG (frequency generator) magnet 60 having 360 magnetic poles is provided.

The stator 20 is comprised of a stator substrate 70 and six stator coils 80 of coreless assemblies. The stator substrate 70 is made of a soft magnetic steel sheet having an insulating layer and an electronic circuit thereon. The electronic circuit is formed by etching a copper layer on the insulating layer. The six stator coils 80 of coreless assemblies are disposed at 60 degrees apart around the center of the shaft 40 respectively, and fixed to the stator substrate 70. The stator coils 80 face the drive magnet 50. Respective two of the stator coils 80, opposed each other across the spindle 90, are wired in a series connection, and compose three phases of stator coils of a star connection as a whole. Two Hall elements HGU and HGV are disposed at a center of stator coils 80 which are separated at 120 degrees apart from each other as shown in FIG. 6. The Hall elements HGU, HGV output Hall signals U, V of Hall voltages respectively, in response to a magnetic flux of the drive magnet 50 as it rotates.

A magnetic sensor of magnetoresistance (MR) element (not shown) is placed on the stator 20, and face an outer edge of the FG (frequency generator) magnet 60 across a gap of 0.1 mm. The FG magnet 60 is provided on the rotor 30. The magnetic sensor outputs an FG signal of 360 Hz per revolution. The FG signals are used as speed control signals of a brushless motor, and supplied to a drive circuit contained in an integlated circuit (IC) 140, for supplying a drive current to a stator coil 80.

The Hall signals U and V are added together and then reversed the phase thereof to form a compound signal W.

A waveform of the Hall signal U (V) is depended on a waveform of a magnetization of the drive magnet 50. When the drive magnet 50 is magnetized in a sine wave, the wave form of the Hall signal U (V) becomes a sine wave. The Hall signal U, V and the compound signal W form three phases of positional signals, and differ 120 degrees in electric phase angle each other. These three phases of positional signals are supplied to the drive circuit. The drive current, subjected to the FG signals, is switched by the three phases of signals U, V and W. The drive circuit supplies the switched drive current to the respective stator coils 80. A revolving magnetic field is produced by the switched drive current fed to the stator coils 80, and rotates the rotor 30.

The compound signal W, provided by adding the Hall signals U, V, and then by reversing the phase of the added signal, is required to have a same waveform of the Hall signal U (V), and to have a small phase error referred to respective phases of the Hall signals U and V. When the Hall signals U, V of sine wave differs in the phase of 120 degrees, the compound signal W can be made to a sine wave and to have the phase of 120 degrees from those of the Hall signals U, V respectively as shown in FIG. 1.

In general, amplitudes of the Hall signals U, V differ each other, as a Hall element has a sensitivity variation. Due to the amplitude difference, the phase of the compound signal W is shifted in relation to the Hall signals U and V as shown in FIG. 2. This phase shift of the compound signal W causes a timing shift of switching of the drive current supplied to the stator coil 80, and an irregularity of rotation increases. When the Hall signals U and V are made to a trapezoidal wave to generate a large torque from the brushless motor, a waveform of the compound signal W becomes a triangular shape. This triangular shape of the compound signal W can be corrected into a corrected compound signal W' of trapezoidal wave by a nonlinear circuit. But, when there is a difference between the amplitudes of the Hall signals U and V, the waveform of the corrected compound signal W' becomes different from those of the Hall signals U, V, and causes a phase shift as shown in FIG. 3. For this reason, the larger the difference between the amplitudes of the Hall signals U and V becomes, the larger the irregularity of rotation becomes as shown in FIG. 4.

SUMMARY OF THE INVENTION

Accordingly, a general object of the present invention is to provide a brushless motor having a large torque, a small irregularity of rotation and a manufacturing cost.

Another object of the present invention is to provide a motor driving system of a brushless motor comprised of a drive magnet, a spindle, a bearing built in the spindle, a rotational shaft supported by the bearing, a rotor with the drive magnet thereon fixed to the shaft, an FG (frequency generator) magnet provided on the rotor, a stator substrate, 3-phase stator coils facing the drive magnet and provided on the stator substrate, two Hall elements exposed to magnetic fluxes corresponding to the rotational angle of the drive magnet and outputting first and second Hall signals which differ 120 degrees in electric phase each other, a signal composition device for compounding the first and second Hall signals together and outputting a composite signal which differs 120 degrees in phase from the first and second Hall signals, a drive circuit for supplying drive currents responding to the first and second Hall signals and the composite signal to the stator coils, an amplitude detecting device for detecting and outputting a difference between the first and second Hall signals, and an amplitude control device for cancelling the difference.

Further and another object of the present invention is to provide a motor driving system of a brushless motor mentioned as above further comprised of an amplitude control device which is characterized by including two differential amplifiers for minimizing an amplitude difference between the first and second Hall signals, one of the differential amplifiers being controlled by regulating a source current thereto from a feedback amplifier, and a gain of the differential amplifier controlled by its source current being set to be smaller by more than 5% than that of another differential amplifier.

Still another object of the present invention is to provide a motor driving system of a brushless motor comprised of a drive magnet, a spindle, a bearing set in the spindle, a rotational shaft supported by the bearing, a rotor fixed to the shaft and provided with a drive magnet thereon, an FG magnet provided on the rotor, a stator substrate, 3-phase stator coils facing the drive magnet and provided on the stator substrate, two Hall elements exposed to magnetic fluxes corresponding to the rotational angle of the drive magnet and outputting the first and second Hall signals which differ 120 degrees in phase each other, first amplifier for amplifying the first Hall signal and outputting an amplified first Hall signal, second amplifier for amplifying the second Hall signal and outputting an amplified second Hall signal, an absolute value device for detecting a difference between the amplified first and second Hall signals and outputting an absolute value thereof, a comparator for converting the absolute value to a trapezoidal wave, a voltage/current converter for converting the trapezoidal wave to a direct current, a feedback amplifier for converting the direct current to a feedback current and outputting the feedback current as a source current for the first amplifier, the first amplifier supplied with the source current for outputting an amplitude controlled first Hall signal, an adder for adding the amplitude controlled first Hall signal and the amplified second Hall signal each other to produce an added signal and then reversing the phase thereof and outputting a compound signal, a nonlinear device for reforming the compound signal to have a waveform of those of the amplitude controlled first Hall signal and the amplified second Hall signal and outputting a reformed compound signal, a limiter for controlling an amplitude of the reformed signal and outputting a composite signal, a drive circuit for switching supplied with amplitude controlled first Hall signal, the amplified second Hall signal and the composite signal and supplying switched signals to stator coils respectively.

Further and another object of the present invention is to provide a motor driving system of a brushless motor comprised of a drive magnet, a rotational shaft, stator coils of three phases facing the drive magnet, two Hall elements supplied magnetic fluxes corresponding to the rotational angle of the rotational shaft and outputting first and second Hall signals which differ 120 degrees in phase each other, a signal composition device for producing a composite signal which differs 120 degrees in phase from the first and second Hall signals, a drive circuit for supplying drive currents to the stator coils, the signal composition device having an adder and a nonlinear device, the drive magnet magnetized in a waveform containing a fundamental component, a 3rd harmonic component having a same phase as that of the fundamental component, and a 5th harmonic component having a same phase as that of the fundamental wave, the difference between the 3rd and the 5th harmonic components being less than 16%, the drive circuit generating a first difference signal between the first and second Hall signals, a second difference between the second Hall signal and the composite signal, and a third difference between the composite signal and the first Hall signal, and controlling a drive current controlled by the first, second and third difference signals for supplying to the stator coils, and the two Hall elements being disposed at angular distance of 60 degrees or less, or the two Hall elements being GaAs Hall elements.

BRIEF DESCRIPTION OF THE DRAWINGS

FIG. 9(A) shows a waveform of a trapezoidal wave, outputted from a comparator, having a duty ratio of 50%;

FIG. 9(B) shows a waveform of a trapezoidal wave, outputted from a comparator, having a duty ratio being different from 50%;

FIG. 10 shows waveforms smoothed by a capacitor;

FIG. 12 shows waveforms of Hall signals and a compound signal;

DETAILED DESCRIPTION OF THE PREFERRED EMBODIMENTS

Figure 1:
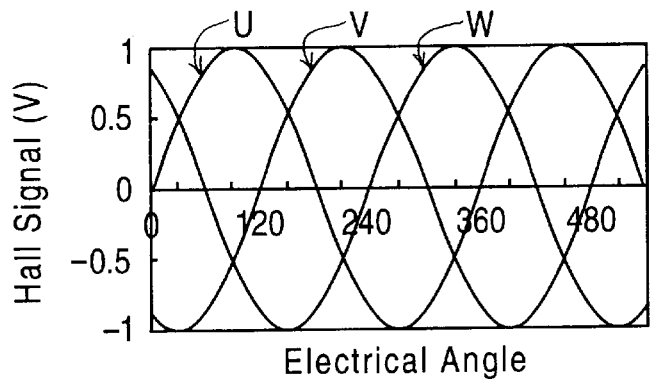
FIG. 1 shows idealized waveforms of first and second Hall signals and a compound signal.
Figure 2:
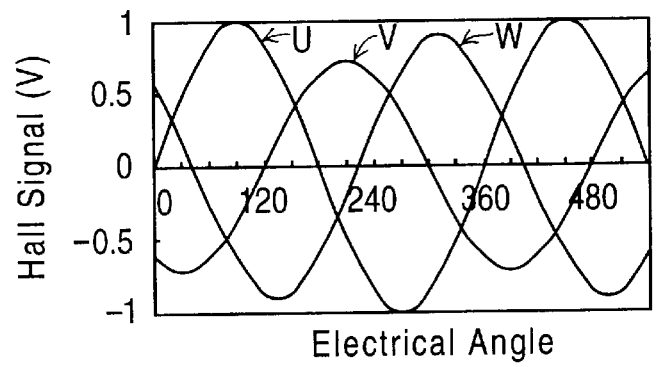
FIG. 2 shows actual waveforms of first and second Hall signals and a composite signal.
Figure 3:
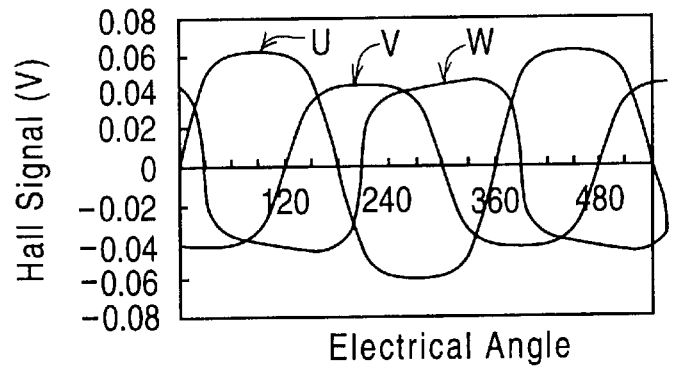
FIG. 3 shows waveforms of first and second Hall signals having difference in amplitudes thereof and of a composite signal.
Figure 4:
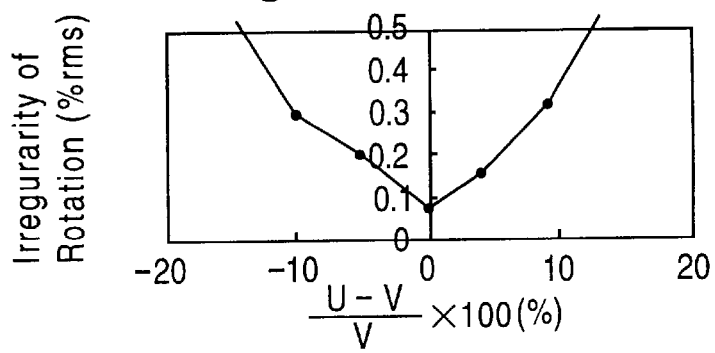
FIG. 4 shows a relation between an irregularity of motor rotation and an amplitude ratio of the Hall signal U to the Hall signal V.

The present invention will now be described in detail with reference to the accompanying drawings in which same reference numerals and symbols are used to denote like or equivalent elements used in the aforementioned prior arts, and detailed explanation of such elements are omitted for simplicity.

A physical construction of a brushless motor of the present invention is similar to that of a prior art, and an explanation will be described referring to FIGS. 5 and 6.

Figure 5:
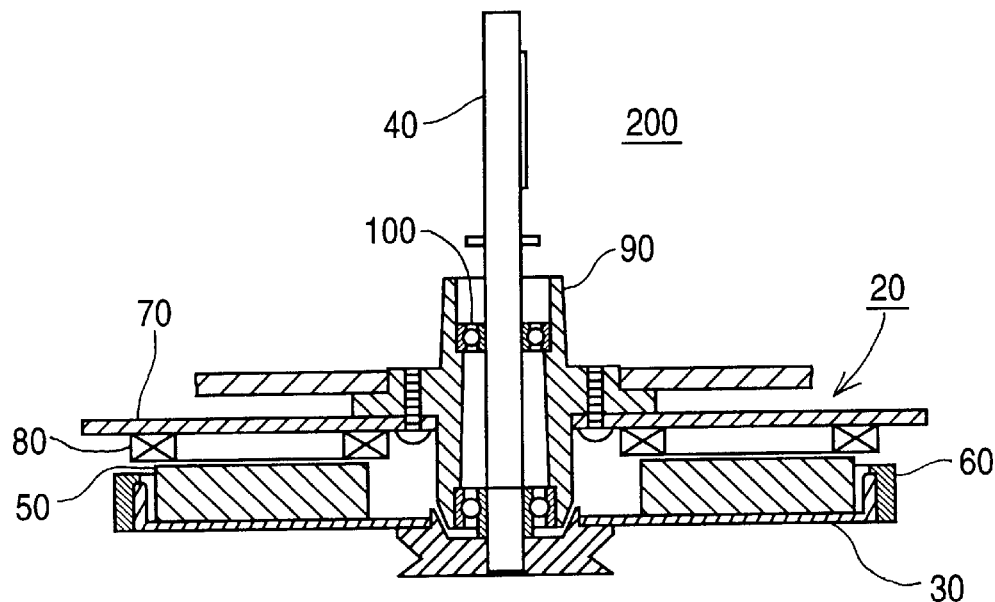
FIG. 5 shows a sectional view of a brushless motor for driving directly a capstan shaft of a video tape recorder.

FIG. 5 shows a sectional view of a brushless motor for driving directly a capstan shaft of a video tape recorder.

Figure 6:
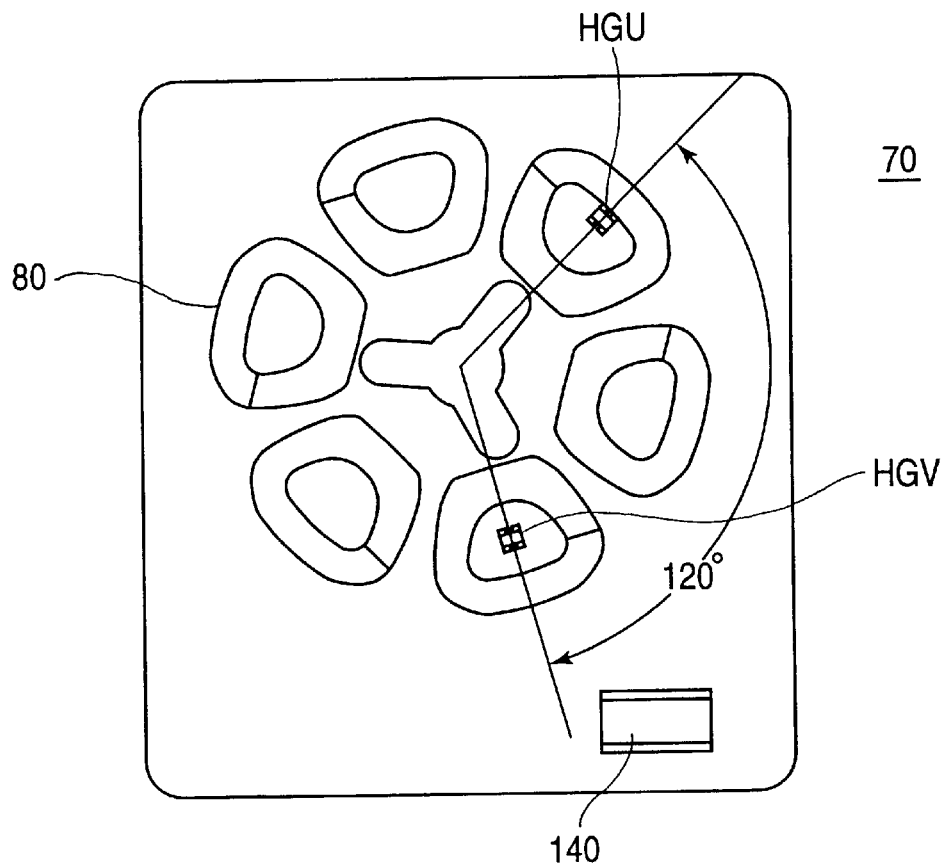
FIG. 6 shows a plan view of a stator of the brushless motor shown in FIG. 5.

FIG. 6 shows a plan view of a stator of the brushless motor shown in FIG. 5.

A motor driving system 200 of a brushless motor of the present invention has a drive magnet 50 magnetized in predetermined intensities of fundamental wave, a 3rd harmonic wave, and a 5th harmonic wave, having multiple magnetic poles, 8 poles for example. The drive magnet 50 is provided on a surface of a rotor 30. A stator 20 is comprised of a stator substrate 70 and six stator coils 80 of coreless assemblies. The stator substrate 70 is made of a soft magnetic steel sheeting having an insulating layer and an electronic circuit thereon. The electronic circuit is formed by etching a copper layer on the insulating layer. The six stator coils 80 of coreless assemblies are arranged at 60 degrees apart each other around the center of a shaft 40, and adhered to the stator substrate 70. The stator coils 80 face the drive magnet 50. A pair of the stator coils 80 opposing each other across the shaft 40, is wired in a series connection, and composes a 3-phase stator coils of a star connection. Two of the stator coils 80, separated angularly 120 degrees each other, have Hall elements HGU, HGV on their centers respectively. The Hall elements HGU, HGV output Hall signals U1, V1 of Hall voltages respectively, which have a phase difference of 120 degrees therebetween responsive to a magnetic flux of the drive magnet 50.

A magnetic sensor of magnetoresistance (MR) (not shown) is provided on the stator 20, and faces an outer edge of an FG (frequency generator) magnet 60 across a space of 0.1 mm. The FG magnet 60 is provided on the rotor 30. The magnetic sensor outputs FG signals of 360 Hz per rotation. The FG signals are used as control signals for controlling a rotational speed of a brushless motor 200, and supplied to a stator drive circuit 10 contained in an integlated circuit IC 140 for controlling a motor drive current.

[First Embodiment]

Figure 7:
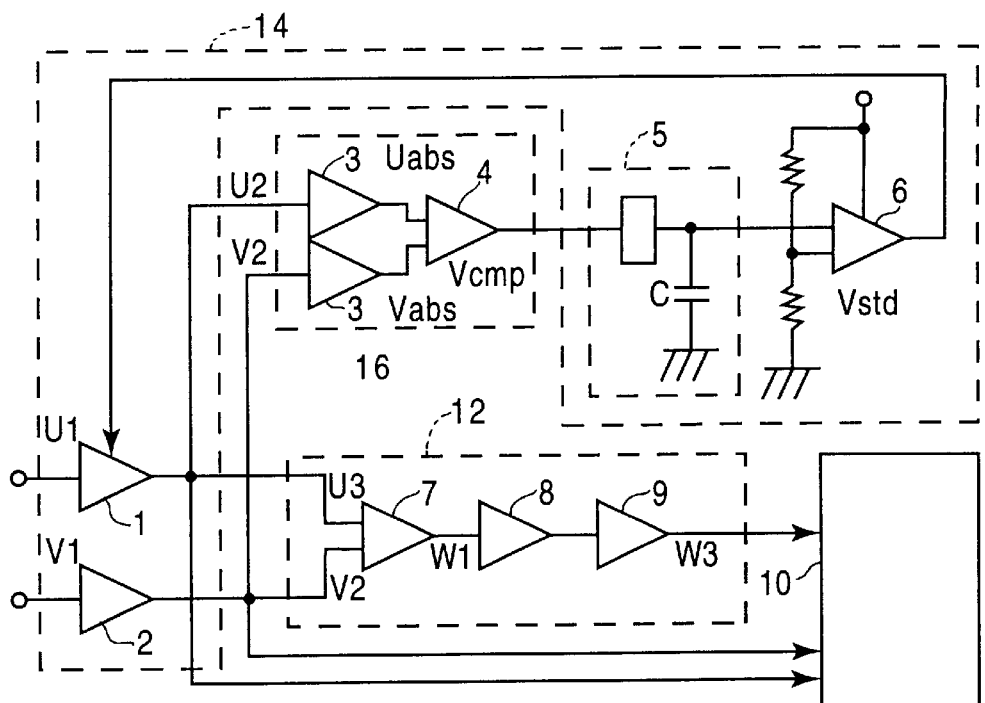
FIG. 7 shows a block diagram of a motor driving system for a brushless motor of first embodiment of the present invention.

FIG. 7 shows a block diagram of a motor driving system for a brushless motor of first embodiment of the present invention.

Figure 8A:
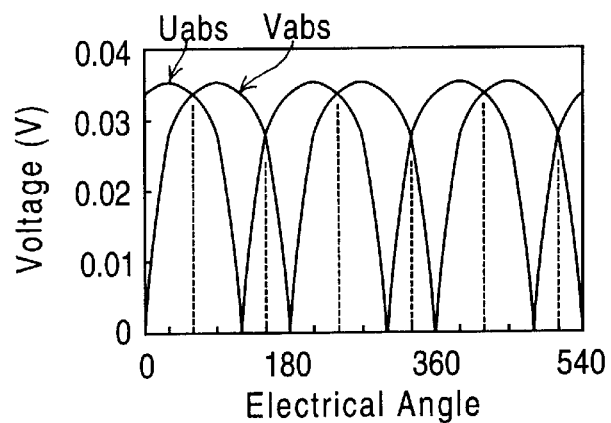
FIG. 8(A) shows absolute values of Hall signals, which are equalized each other.

FIG. 8(A) shows absolute values of Hall signals, which are equalized each other.

Figure 8B:
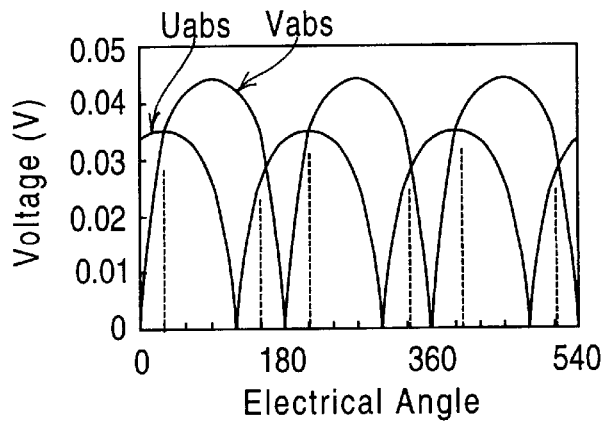
FIG. 8(B) shows absolute values of Hall signals, which are not equalized.

FIG. 8(B) shows absolute values of Hall signals, which are not equalized.

FIG. 9(A) shows a waveform of a trapezoidal wave, outputted from a comparator, having a duty ratio of 50%.

FIG. 9(B) shows a waveform of a trapezoidal wave, outputted from a comparator, having a duty ratio being different from 50%.

FIG. 10 shows waveforms smoothed by a capacitor.

Figure 11A:
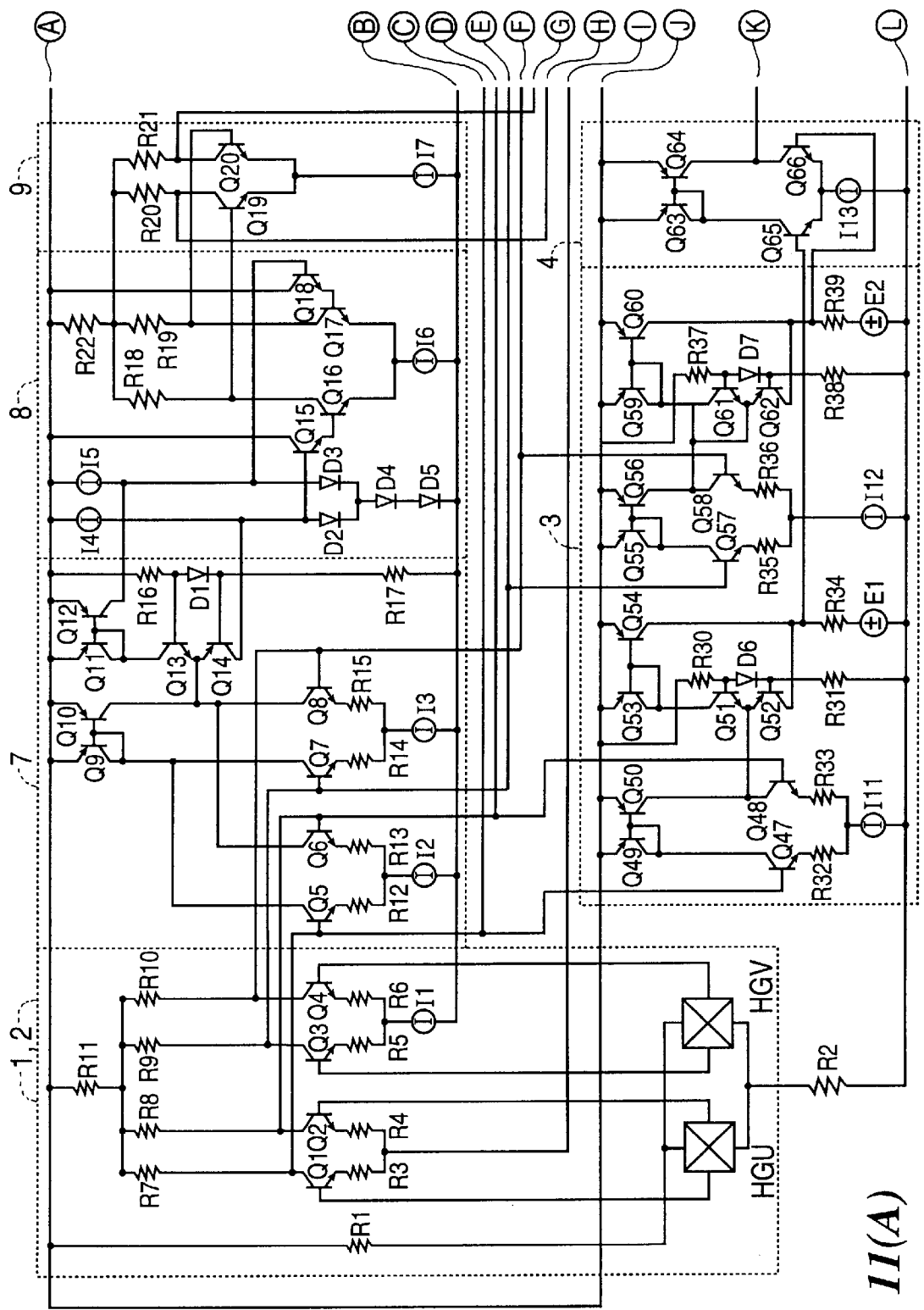
FIGS. 11(A) and 11(B) show a circuit diagram of a motor driving system for a brushless motor of 1st embodiment of the present invention.
Figure 11B:
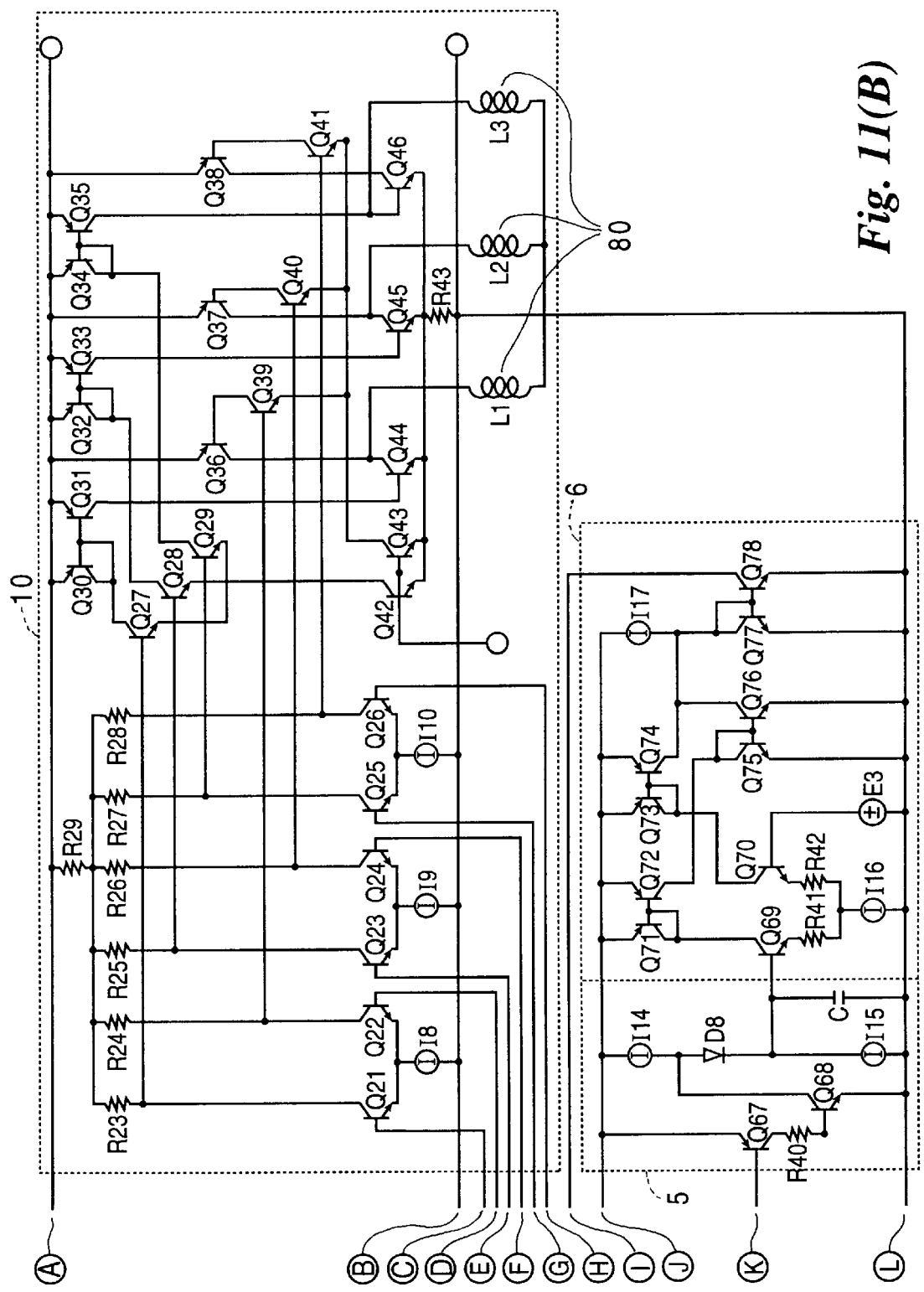

FIGS. 11(A) and 11(B) show a circuit diagram of a motor driving system for a brushless motor of 1st embodiment of the present invention.

FIG. 12 shows waveforms of Hall signals and a compound signal.

Figure 13:
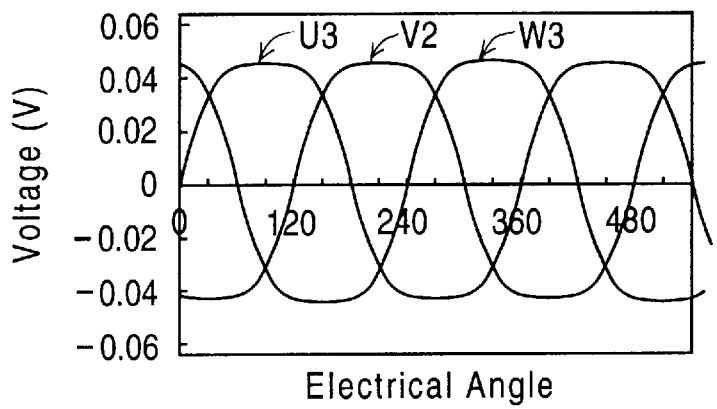
FIG. 13 shows waveforms of Hall signals and a composite signal.

FIG. 13 shows waveforms of Hall signals and a composite signal.

Figure 14:
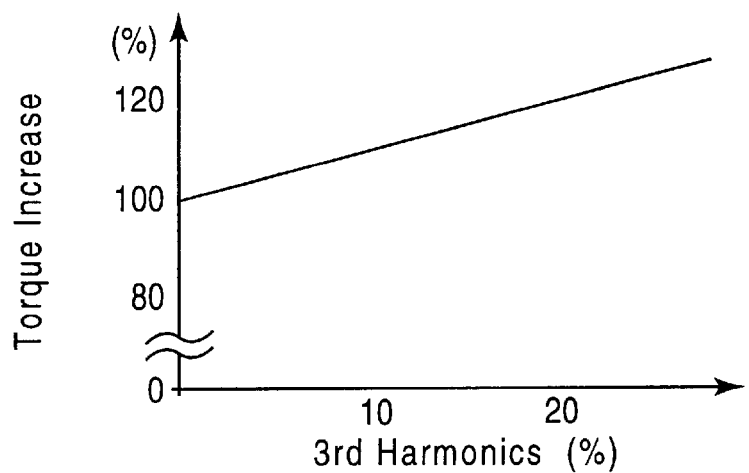
FIG. 14 shows a relation between torque of a brushless motor and 3rd harmonics of a magnetized waveform of a drive magnet.

FIG. 14 shows a relation between torque of a brushless motor and 3rd harmonics of a magnetized waveform of a drive magnet.

FIG. 15($a$) shows a Hall signal of a trapezoidal wave.

FIG. 15($b$) shows another Hall signal of a trapezoidal wave.

FIG. 15($c$) shows a compound signal of a triangular wave.

FIG. 15($d$) shows a composite signal of a trapezoidal wave.

FIG. 15($e$) shows a compound signal of a distorted triangular wave.

FIG. 15($f$) shows a compounded result of a distorted triangular wave shown in FIG. 15($e$).

FIG. 15($g$) shows a compound signal of a more distorted triangular wave than that shown in FIG. 15($e$).

FIG. 15($h$) shows a compounded result of a more distorted triangular wave shown in FIG. 15($g$).

FIG. 15($i$) shows a compound signal of a triangular wave which contains a certain degree of 5th harmonic in addition to more than 8% of a 3rd harmonic in the magnetized waveform of the drive magnet 50.

FIG. 15($j$) shows a composite signal derived from a compound signal shown in FIG. 15($i$).

FIG. 15($k$) shows a signal provided by a difference between a controlled amplified Hall signal and an amplified Hall signal.

FIG. 15($l$) shows a signal provided by a difference between an amplified Hall signal and a composite signal.

FIG. 15($m$) shows a signal provided by a difference between a composite signal and a controlled amplified Hall signal.

Figure 16:
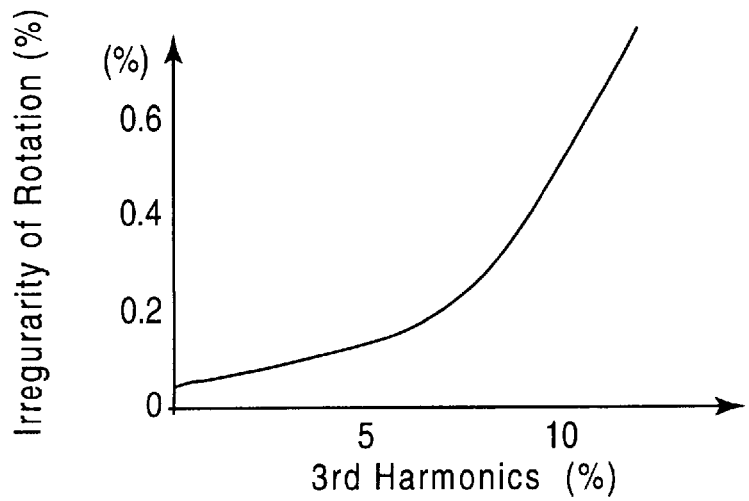
FIG. 16 shows a relation between an irregularity of rotation and a 3rd harmonic of a magnetized waveform of a drive magnet.
Figure 15A:
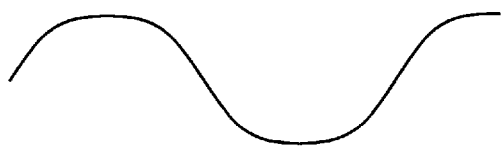
FIG. 15(a) shows a Hall signal of a trapezoidal wave.
Figure 15H:
FIG. 15(h) shows a compounded result of a more distorted triangular wave shown in FIG. 15(g)
Figure 15B:
FIG. 15(b) shows another Hall signal of a trapezoidal wave.
Figure 15I:
FIG. 15(i) shows a compound signal of a triangular wave which contains a certain degree of 5th harmonic in addition to more than 8% of a 3rd harmonic in the magnetized waveform of the drive magnet 50.
Figure 15C:
FIG. 15(c) shows a compound signal of a triangular wave.
Figure 15J:
FIG. 15(j) shows a composite signal derived from a compound signal shown in FIG. 15(i)
Figure 15D:
FIG. 15(d) shows a composite signal of a trapezoidal wave.
Figure 15K:
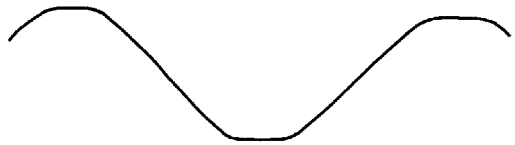
FIG. 15(k) shows a signal provided by a difference between a controlled amplified Hall signal and an amplified Hall signal.
Figure 15E:
FIG. 15(e) shows a compound signal of a distorted triangular wave.
Figure 15L:
FIG. 15(l) shows a signal provided by a difference between an amplified Hall signal and a composite signal.
Figure 15F:
FIG. 15(f) shows a compounded result of a distorted triangular wave shown in FIG. 15(e)
Figure 15M:
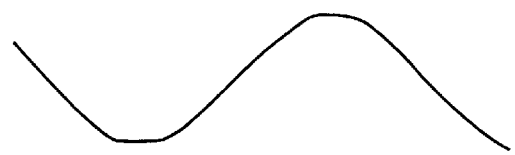
FIG. 15(m) shows a signal provided by a difference between a composite signal and a controlled amplified Hall signal.
Figure 15G:
FIG. 15(g) shows a compound signal of a more distorted triangular wave than that shown in FIG. 15(e)

FIG. 16 shows a relation between an irregularity of rotation and a 3rd harmonic of a magnetized waveform of a drive magnet.

Figure 17:
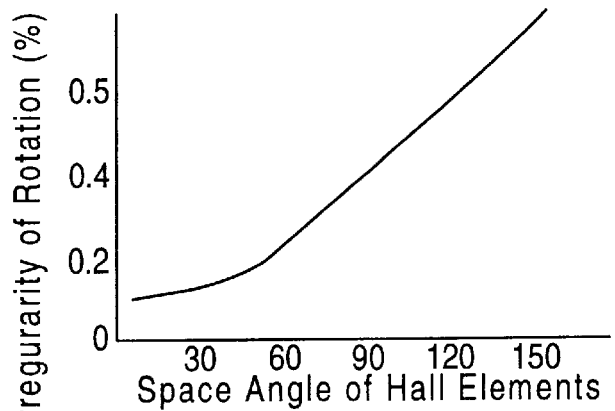
FIG. 17 shows a relation between an irregularity of motor rotation and a space angle of Hall elements.

FIG. 17 shows a relation between an irregularity of motor rotation and a space angle of Hall elements.

Figure 18:
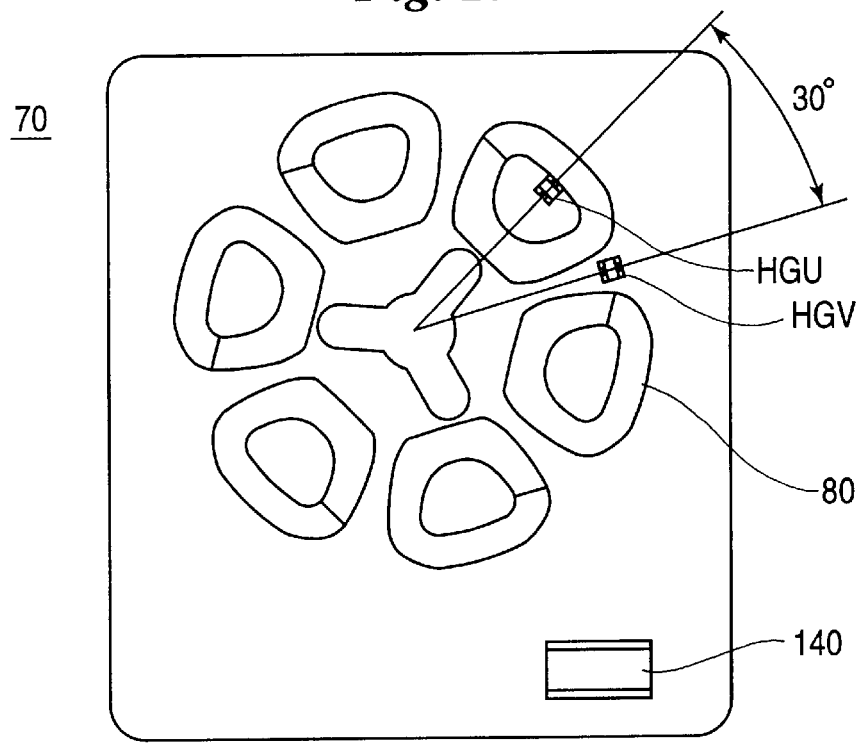
FIG. 18 shows a plan view of a stator of a brushless motor of first embodiment of the present invention.

FIG. 18 shows a plan view of a stator of a brushless motor of first embodiment of the present invention.

Figure 19A:
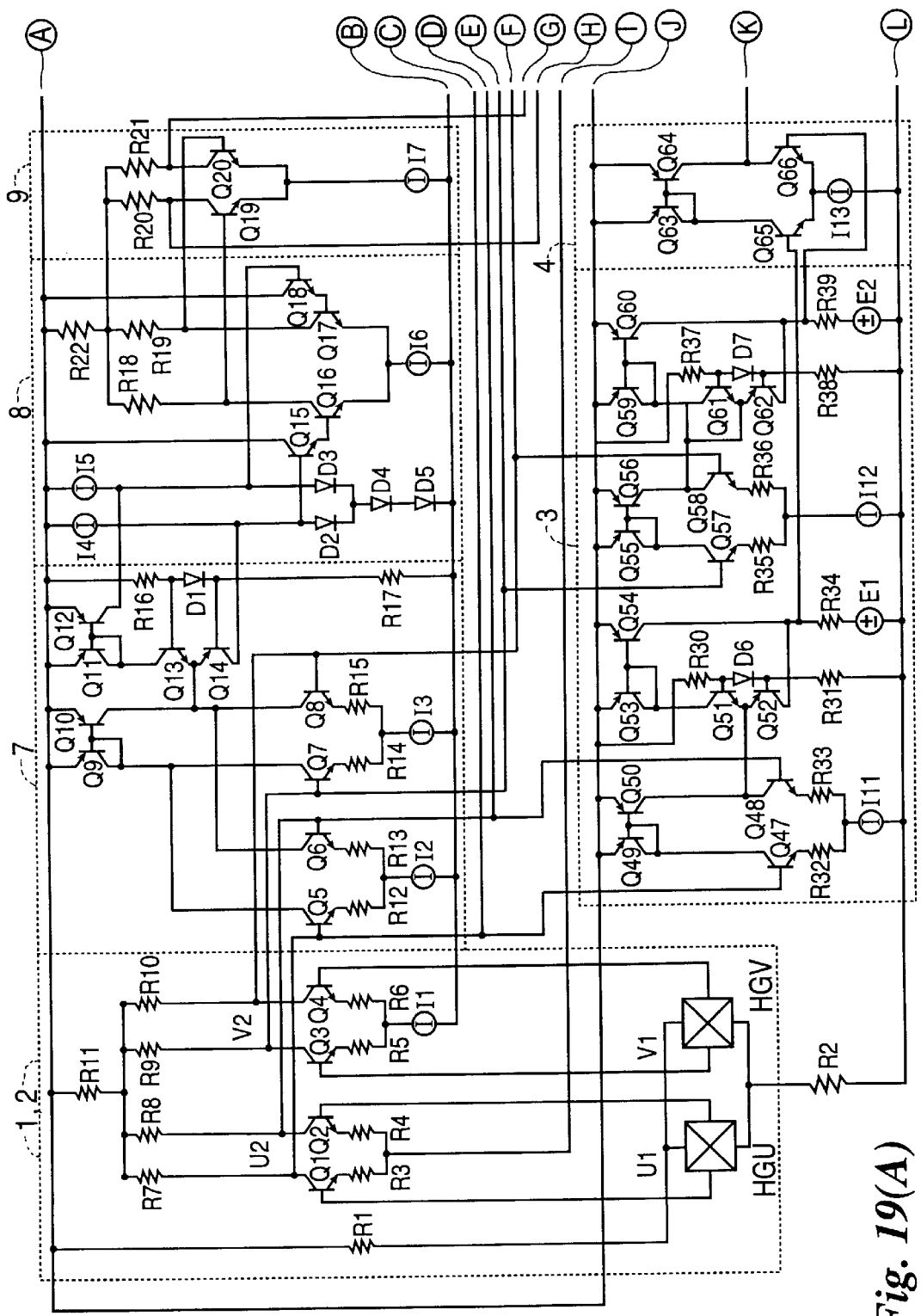
FIGS. 19(A) and 19(B) show another electronic circuit of a motor driving system for a brushless motor of 1st embodiment of the present invention.
Figure 19B:
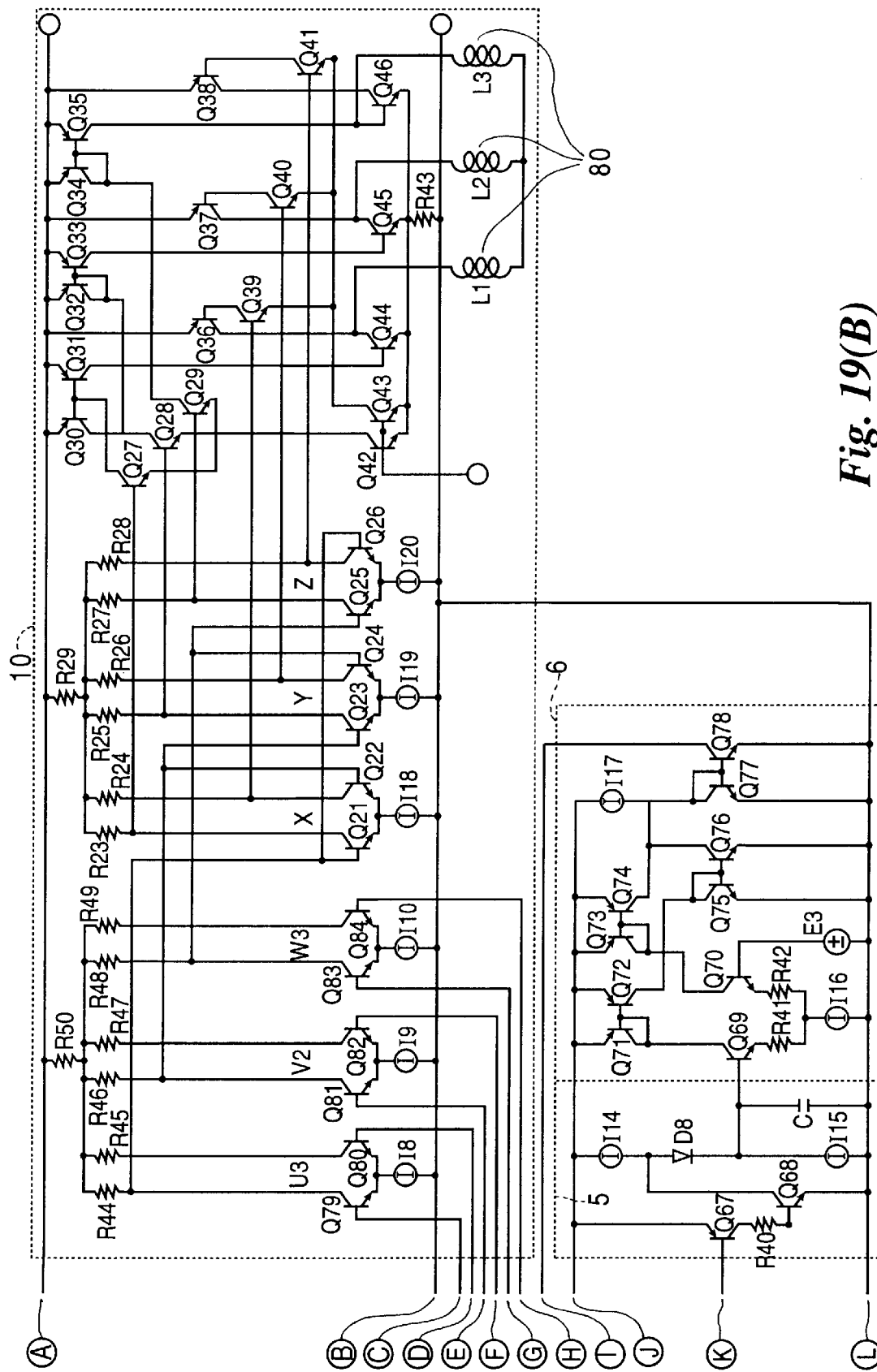

FIGS. 19(A) and 19(B) show another electronic circuit of a motor driving system for a brushless motor of 1st embodiment of the present invention.

As shown in FIG. 7, an amplitude control device 14 includes a first amplifier 1, a second amplifier 2, a voltage/current converter 5, and a feedback amplifier 6, and further, an amplitude detecting device 16 includes an absolute value device 3 and a comparator 4. The first amplifier 1 and the second amplifier 2 amplify Hall signals U1, V1 respectively. Then amplified Hall signals U2, V2 are outputted to the absolute value device 3. The absolute value device 3 output absolute values Uabs, Vabs of Hall signals, respectively. FIG. 8(A) shows a case that the absolute values Uabs, Vabs of the Hall signals are equal each other. The comparator 4 compares the Hall signals Uabs, Vabs over every electrical degree, and outputs the result as a trapezoidal wave signal Vcmp, as shown in FIGS. 9(A), 9(B). When the absolute values Uabs, Vabs of the Hall signals are equal each other as shown in FIG. 8(A), the duty ratio of the trapezoidal wave signal Vcmp is 50% as shown in FIG. 9(A). On the other hand, when the absolute values Uabs, Vabs of the Hall signals are not equal as shown in FIG. 8(B), the duty cycle of the trapezoidal wave signal Vcmp differs from 50%, as shown in FIG. 9(B). The voltage/current converter 5 converts the trapezoidal wave signal Vcmp into a current, then a capacitor C smooths the current to a direct current having a ripple as shown in FIG. 10. The direct current is inputted to the feed back amplifier 6. The feedback amplifier 6 converts the direct current into a direct voltage, and compares the direct voltage with a predetermined voltage Vstd. The feedback amplifier 6 controls a voltage gain of the first amplifier 1 by varying a source current for the first amplifier 1, so as to equalize the amplified Hall signal U2 with the amplified Hall signal V2. In other words, the duty ratio of the trapezoidal wave signal Vcmp is controlled so as to be 50%. As a result, as shown in FIG. 13, the first amplifier 1 usually outputs an amplitude controlled Hall signal U3 equalized to the amplified Hall signal V2.

As shown in FIG. 7, a signal composition device 12 is comprised of an adder 7, a nonlinear device 8, and a limiter 9. The adder 7 adds the amplitude controlled Hall signal U3 and the amplified Hall signal V2, then reverses the phase of the added signal, and outputs the added and reversed signal as a compound signal W1. The compound signal W1 is modified by an operation of the nonlinear device 8, and by the limiter 9 to a composite signal W3. The controlled amplified Hall signal U3, the amplified Hall signal V2, and the composite signal W3 are outputted from the first amplifier 1, the second amplifier 2, and the limiter 9 respectively, and supplied to a drive circuit 10 for driving a 3-phase brushless motor.

FIGS. 11(A) and 11(B) show a circuit diagram of the motor driving system for a brushless motor of the first embodiment of the present invention.

In FIGS. 11(A) and 11(B), Hall elements HGU, HGV are connected parallel each other, supplied with bias currents through resistors R1, R2 respectively. Output terminals of the Hall elements HGU, HGV are connected to base terminals of transistors Q1, Q2, Q3, Q4 respectively, which compose differential amplifiers.

The transistors Q1 and Q2, resistors R1, R3, R4, R7, R8 and R11 compose the first amplifier 1. The transistors Q3 and Q4, resistors R1, R5, R6, R9, R10 and R11, and a current source I1 compose the second amplifier 2. Here, the resistors R1 and R11 are shared between the first and the second amplifiers 1, 2. The amplified Hall signals U2, V2 are outputted from respective pairs of the transistors Q1–Q2, Q3–Q4.

The amplified Hall signals U2, V2 are supplied to base terminals of transistors Q47, Q48, Q57 and Q58 for detecting the difference of amplitudes between the amplified Hall signals U2, V2. The transistors Q47 through Q62, resistors R30 through R39, current sources I11, I12, diodes D6, D7, and voltage sources E1, E2 compose an absolute value device 3. The transistors Q54 and Q60 output the absolute values Uabs, Vabs of Hall signals from the collector terminals thereof respectively. The absolute values Uabs, Vabs of Hall signals are supplied to base terminals of transistors Q65, Q66 which are input terminals of the comparator 4.

The transistors Q63 through Q66, and a current source I13 compose the comparator 4. The comparator 4 outputs the trapezoidal wave signal Vcmp from a collector terminal of transistor Q64 to a base terminal of a transistor Q67.

Transistors Q67, Q68, current source I15, resistor R40, and a capacitor C compose a voltage/current converter 5, which changes the square wave signal Vcmp to a current. The capacitor C smooths the current to a direct current having a ripple. The direct current is outputted from the cathode of the diode D8 to a base terminal of a transistor Q69.

Transistors Q69 through Q78, resistors R41, R42, a voltage source E3, and a current sources I16, I17 compose the feedback amplifier 6. The feedback amplifier 6 converts the direct current to a direct voltage and compares the direct voltage with the predetermined voltage Vstd supplied from the voltage source E3, and output the difference between them from a collector terminal of the transistor Q78 as a feedback current. The feedback current is supplied to the first amplifier 1 as a source current thereof. The amplified Hall signal U2 which is the output of the first amplifier 1, is changed to become equal to the amplified Hall signal V2 by varying the feedback current. Thus, the amplified Hall signal U2 is changed to the amplitude controlled Hall signal U3.

The amplitude controlled Hall signal U3 and the amplified Hall signal V2 are supplied to base terminals of Q5 through Q8 of differential amplifiers. Transistors Q5 through Q14, resistors R12 through R17, current sources I2, I3 and a diode D1 compose an adder 7.

The adder 7 adds the amplitude controlled Hall signal U3 and the amplified Hall signal V2 together, then reverses the phase of the added signal, and outputs the added and phase reversed signal as a compound signal W1. The compound signal W1 is produced between collector terminals of transistors Q12, Q14 as a current signal. The compound signal W1 is supplied to diodes D2, D3 with bias currents I4, I5, and is converted to a voltage signal. Then the compound signal W1 generated between the anodes of diodes D2, D3 is supplied to base terminals of transistors Q15, Q18.

As shown in FIG. 12, the waveforms of the amplitude controlled Hall signal U3 and the amplified Hall signal V2 are nearly trapezoid, in contrast, the compound signal W1 is a distorted triangle. However, as shown in FIG. 13, the compound signal W1 is reformed into a composite signal W3 of a trapezoid by the nonlinear device 8.

The transistors Q15 through Q18, resistors R18, R19 and R22, and a current source I6 compose a nonlinear device 8. The nonlinear device 8 reforms the compound signal W1, and produces as a reformed signal of the compound signal W1 across collector terminals of the transistors Q16, Q17 and supplies the reformed signal to base terminals of transistors Q19, Q20.

The transistors Q19 and Q20, resistors R20, R21, and a current source I7 compose a limiter 9. The limiter 9 limits the amplitude of the reformed signal, and outputs the limited signal of reformed signal across collector terminals of transistors Q19, Q20 as a composite signal W3. The composite signal W3, the amplitude controlled Hall signal U3, and the amplified Hall signal V2 are supplied to respective pairs of transistors Q21–Q22, Q23–Q24, and Q25–Q26 as 3 phases of positional signals.

The transistors Q21 through Q26, resistors R23 through R29 and R43, and a current source I8 compose the drive circuit 10. The drive circuit 10 amplifies a motor speed control signal supplied to a base terminal of a transistor Q42 to a predetermined value as a drive current, and switches the drive current by utilizing the composite signal W3, the amplitude controlled Hall signal U3 and the amplified Hall signal V2. Then the drive circuit 10 supplies the switched drive current to the respective stator coils 80 shown as inductances L1 through L3 in FIG. 11(B).

Nowadays, downsizing and having high efficiency are general demands for equipment. A brushless motor as such a equipment, is demanded to decrease its drive current and to increase a torque. For this purpose, the waveform of the magnetization of the drive magnet 50 is modified from a sine wave to a trapezoidal wave, which has an effect to increase the total amount of the magnetic flux generated from the drive magnet 50.

The drive magnet 50 on the rotor 30 is magnetized in a waveform containing a fundamental wave, a third harmonic wave, and a fifth harmonic wave. The difference in harmonic content between the third harmonic wave and the fifth harmonic wave is made to be less than 16%.

As the content of the third harmonic wave increases, a waveform area i.e. a driving energy of the wave also increases, as far as the third harmonics wave is less than 66% of the fundamental wave. As shown in FIG. 14, the torque of the brushless motor increases as the content rate of the 3rd harmonic wave increases. Accordingly, when the third harmonic content in the drive magnet 50 increases by 10% the fundamental wave component increases about 10%, this results an increase of the torque of the brushless motor 200 by 10%. The Hall elements HGU, HGV are also subjected to the magnetic flux containing the third harmonic of the drive magnet 50 on the rotor 30. As a result, the Hall signals U1, V1 contain the third harmonic. The compound signal W1 is formed by adding the amplitude controlled Hall signal U3 and the amplified Hall signal V2 and by reversing the phase of the added signal. The compound signal W1 contains distortions which are different from those of the amplitude controlled Hall signal U3 and the amplified Hall signal V2. As the content of the third harmonic increases, the distortion of the compound signal W1 increases, and at some magnitude of the third harmonic content, the gradient of the compound signal W1 at around its zero-crossing point becomes very gentle as shown in FIG. 15(*e*). The nonlinear device 8 can not fully compensate this problem resulting the composite signal W3 still containing a large distortion being outputted as shown in FIG. 15(*f*). Thus, the 3-phase drive currents become different each other, and a speed irregularity of rotation of the brushless motor becomes worse. Especially, when the content of the 3rd harmonic is over 16%, the gradient of the compound signal W1 at the zero-crossing thereof is reversed as shown in FIG. 15(*g*). Then, the composite signal W3 is distorted badly as shown in FIG. 15(*h*), and generate a torque in a reverse direction.

FIG. 16 shows a relation between the content of the 3rd harmonic of the magnetized waveform of the drive magnet 50 and the irregularity of rotation of the brushless motor. As the content of the 3rd harmonic increases, he irregularity of rotation increases. When the content of the 3rd harmonic is over 8%, the irregularity of rotation is over 0.3%, which is unacceptable.

It was proved that the gradient of the compound signal W1 at the zero-crossing thereof was not reversed as shown in FIG. 15(*i*) when some content of 5th harmonic was added to the magnetized waveform of the drive magnet 50 having more than 8% of the 3rd harmonic. Then, the composite signal W3 was reformed as shown in FIG. 15(*j*). As a result, the brushless motor has a small irregularity of rotation.

It was also proved that the gradient of the compound signal W1 at the zero-crossing thereof was not reversed even if the content of the 3rd harmonic was over 16%, when the difference between the content of the 3rd harmonic and that of the 5th harmonic was less than 16%. Then, the torque in the reverse direction didn't generate. It was proved that the brushless motor had a small irregularity of rotation when the content difference between the 3rd harmonic and the 5th harmonic was less than 12%.

The brushless motor 200 has a small irregularity of rotation when portions of the drive magnet 50 which cause the Hall elements HGU, HGV to generate the first and second Hall signals U1 and V1 are magnetized in the waveform containing the respective contents of a fundamental wave, a 3rd harmonic wave, and a 5th harmonic wave as described in the foregoing, and other portions of the drive magnet 50, which do not subject the Hall signals U1 and V1, are not needed to be magnetized accurately.

In the foregoing discussion, the "magnetized waveform" of the drive magnet 50 as well as its harmonic contents are determined as such that the signal generated from the Hall elements HGU and HGV, is observed by a spectrum analyzer which indicates power spectrum.

As mentioned before, the compound signal W1 is provided by adding the amplitude controlled Hall signal U3 and the amplified Hall signals V2, then the phase of the added signal is reversed in the adder 7. The amplitude controlled Hall signal U3 and the amplified Hall signal V2 are trapezoid in their waveforms as the drive magnet 50 is magnetized in the trapezoid waveform. The amplitude controlled Hall signal U3 and the amplified Hall signal V2 are shown in FIGS. 15(*a*) and 15(*b*) respectively. The compound signal W1 is almost triangular as shown in FIG. 15(*c*).

The nonlinear device 8 has an electronic characteristic which has a large gain at a small input signal and a small gain at a large input signal so as to convert a triangular input signal to a trapezoid output signal. Thus, the compound signal W1 of a triangular wave is converted to the composite signal W3 of a trapezoidal wave shown in FIG. 15(*d*), by the nonlinear device 8.

In practice, the compound signal W1 inputted to the nonlinear device 8 is raised to the ¾th power, then the raised triangular wave signal is converted to the trapezoidal wave signal by utilizing a logarithmic characteristics of a differential amplifier. It was proved that preferable multiplication was ranged ½ through ¹⁄₁ power, and more preferable was ½ through ⅚ power.

It is very difficult to reduce a surface runout of the drive magnet 50 on the rotor 30, even if the drive magnet 50 is manufactured carefully. Because of the surface runout, the output of the Hall elements HGU, HGV are amplitude modulated (AM) per revolution of the rotor 30, as they are exposed to the magnetic flux generated from such a drive magnet 50. As a result, when the Hall elements HGU and HGV are positioned apart, the magnitude of magnetic flux radiated to the respective Hall elements HGU, HGV are largely different each other, thus, respective outputs thereof are different each other. Thus, the respective waveforms of the compound signal W1 and the composite signal W3 are distorted, and cause to increase irregularity of rotation of the rotor 30.

In this embodiment, it is proved that the irregularity of rotation becomes less than 0.25% when the angular distance between the Hall elements HGU, HGV with respect to the center of the shaft 40 is less than 60 degrees, and it becomes less than 0.15% when the opening angle thereof is less than 45 degrees. FIG. 17 shows a relationship between the angular distance of the Hall elements HGU, HGV and the irregularity of rotation. FIG. 18 shows a layout of Hall elements HGU, HGV on the stator substrate 70 positioned at 30 degrees of angular distance with respect to the center of the shaft 40, wherein the Hall elements HGU, HGV output Hall signals U1, V1 having an electric phase difference of 120 degrees therebetween.

Output voltage of the Hall element HGU (HGV) deviates as the ambient temperature changes. When the output voltage of the Hall element HGU (HGV) deviates, the waveform of the output of nonlinear device 8 changes, which leads to an increase of the irregularity of rotation. Therefore, the Hall element HGU (HGV) is conditioned to operate at a predetermined temperature range.

To solve this problem, the nonlinear device 8 has to have a thermal compensation characteristic, which requires a complicated construction of the nonlinear device 8. An introduction of a GaAs Hall element having a small thermal coefficient, reduces the thermal deviation of the Hall signal, simplifies the construction of the nonlinear device, reduces a distortion of the output of the nonlinear device, reduces the thermal shift of the rotational speed, and widens a usable temperature range of the brushless motor.

In this embodiment, the irregularity of rotation is improved as such that detecting the difference between the Hall signals U1 and V1, the amplitude of the Hall signals U1 and V1 are adjusted responsive to the difference, amplitude controlled Hall signal U3 and amplified Hall signal V2 are added and phase-reversed, thus the composite signal W3 for controlling the motor driving signals optimumly is obtained.

The drive circuit 10 shown in FIG. 19(B) detects an amplitude difference X between the amplitude controlled Hall signal U3 and the amplified Hall signal V2, detects an amplitude difference Y between the amplified Hall signal V2 and the composite signal W3, detects an amplitude difference Z between the amplitude controlled Hall signal U2 and the composite signal W3, and these differences X, Y and Z control, as switching signals, the drive currents to be supplied to the stator coils 80.

On the other hand, when the amplitude controlled Hall signal U3, the amplified Hall signal V2 and the composite signal W3 of trapezoidal waves are supplied to the stator coils 80 as drive signals respectively, the trapezoidal waves being very steep in the switching region, are liable to have phase errors of their switching region, which in turn cause irregularity of switching of the drive currents flowing to the stator coil 80. This irregularity increases vibration, and an electro-magnetic noise of the brushless motor 200.

The signals of the amplitude difference X between the amplitude controlled Hall signal U3 and the amplified Hall signal V2, the difference Y between the amplified Hall signal V2 and the composite signal W3, and the difference Z between the composite signal W3 and the amplitude controlled Hall signal U3 are almost sine waves as shown in FIGS. 15(*k*), 15(*l*) and 15(*m*) respectively, as third harmonic contained in each signal is cancelled out in the detection of the difference.

The noise the vibration, and the electro-magnetic noise of the brushless motor are reduced when the signals of difference X, Y, and Z are utilized for switching the drive currents which are supplied to the stator coils 80, as the drive currents in their respective switching regions are gradual of gradient. Moreover, the drive magnet 50 radiates trapezoidal waveform of magnetic flux to the stator coils 80, which generates a large torque of the brushless motor 200.

[Second Embodiment]

FIG. 10 shows waveforms smoothed by a capacitor.

Figure 20:
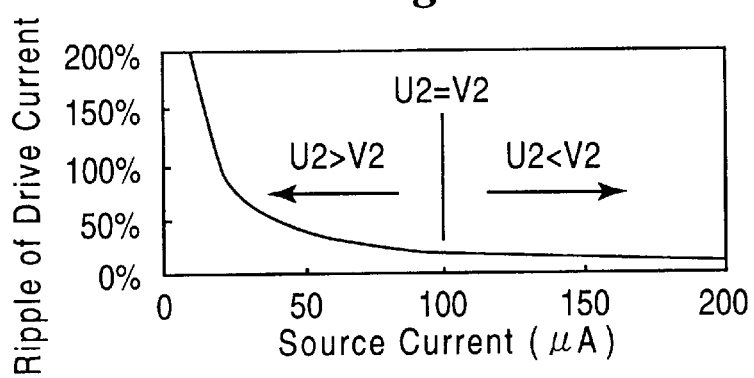
FIG. 20 shows a ratio of a ripple component to a DC component in a source current as a function of the source current.

FIG. 20 shows a ratio of a ripple component to a DC component in a source current as a function of the source current.

Figure 21:
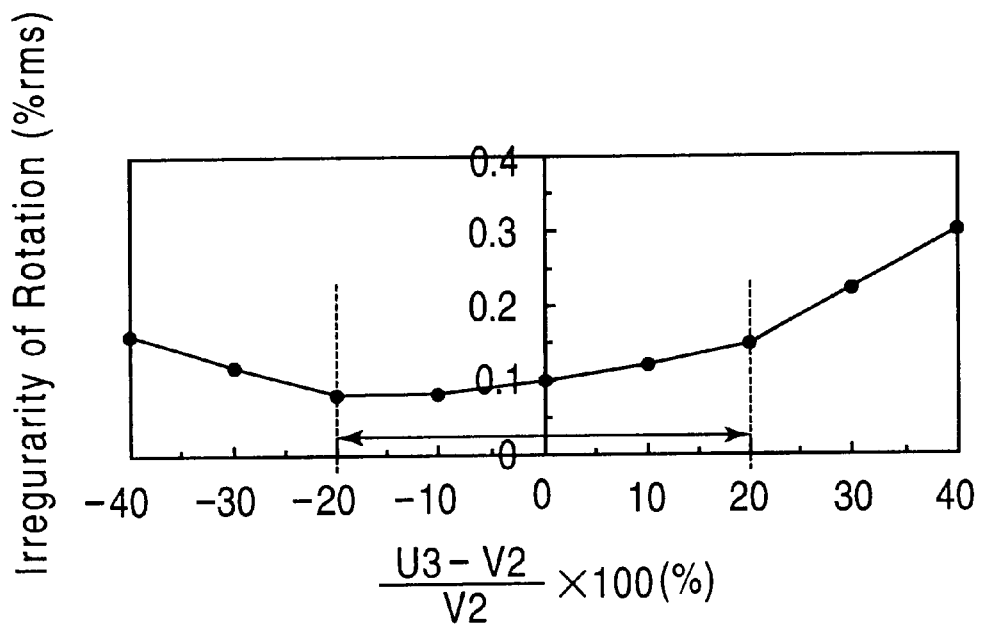
FIG. 21 shows an irregularity of motor rotation as a function of the difference expressed in percent between the 2 Hall signals, one of which is amplitude controlled in the 1st embodiment of the present invention.

FIG. 21 shows an irregularity of motor rotation as a function of the difference expressed in percent between the 2 Hall signals, one of which is amplitude controlled in the 1st embodiment of the present invention.

Figure 22:
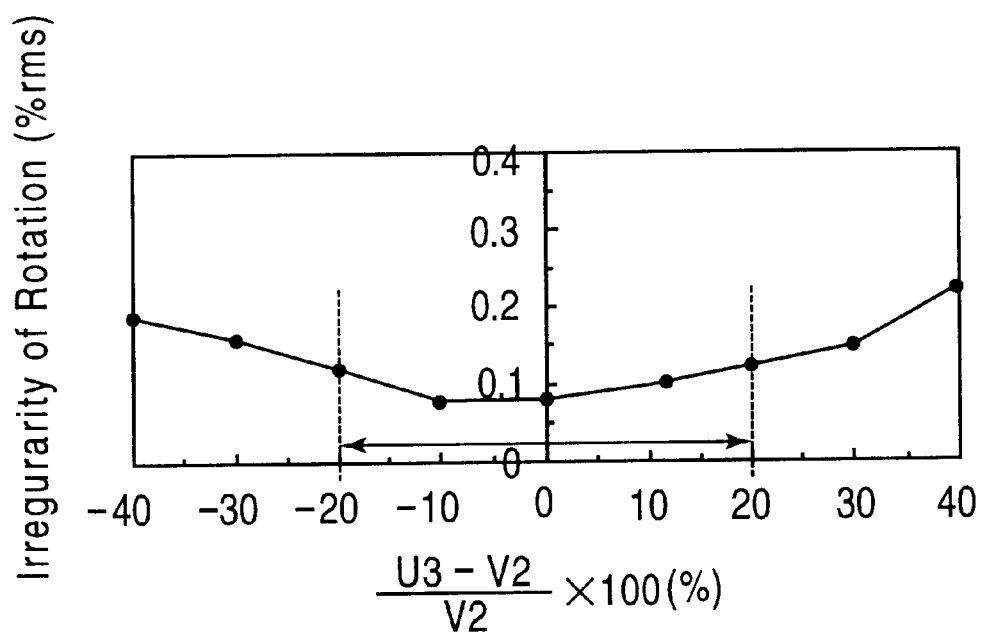
FIG. 22 shows an irregularity of motor rotation as a function of the difference expressed in percent between the 2 Hall signals, one of which is amplitude controlled in the 2nd embodiment of the present invention.

FIG. 22 shows an irregularity of motor rotation as a function of the difference expressed in percent between the 2 Hall signals, one of which is amplitude controlled in the 2nd embodiment of the present invention.

A feedback current of a feedback amplifier 6 has a ripple as shown in FIG. 10. When a ratio of the ripple to a direct current shown in FIG. 10 increases, the waveform distortion of the amplitude controlled Hall signal U3 also increases. As a result, a composite signal W3 is also distorted, and the irregularity of rotation of the brushless motor 200 becomes worse. One case is described that a current of a current source I1 of the second amplifier 2 for amplifying a Hall signal V1 is fixed, and a current of a current source of a first amplifier 1 for amplifying a Hall signal U1 is variable and supplied from the feedback amplifier 6. As shown in FIG. 10, a DC component of a feedback current decreases when an amplified Hall signal U2 is larger than the amplified Hall signal V2. The DC component of the feedback current increases when the amplified Hall signal U2 is smaller than the amplified Hall signal V2. The ripple contained in the feedback current is independent of the ratio therebetween. As shown in FIG. 20, the ratio of the ripple to the DC component of the feedback current is large when the amplified Hall signal U2 is larger than the amplified Hall signal V2, and is small when the amplified Hall signal U2 is smaller than the amplified Hall signal V2.

Such a small content of the ripple in the feedback current means a small irregularity of rotation. FIG. 21 shows a characteristics of irregularity of motor rotation in the first embodiment of the present invention. As shown in FIG. 21, the smaller the ratio of the difference of the Hall signal U1 and the Hall signal V1 versus the Hall signal V1 becomes (in other words, the larger the feedback current becomes), the smaller the irregularity of rotation becomes, as far as the feedback amplifier 6 operates within its dynamic range.

In this embodiment, the gain of the first amplifier 1 supplied with the feedback current is set to be at least 5% smaller than that of the second amplifier 2. In other words, the feedback current is at least 5% larger than the source current of the second amplifier 2 when the Hall signals U1 and V1 are equal each other. Under this condition, the ratio of the ripple to the direct current of the feedback current is small, and the irregularity of rotation of the brushless motor is small. When the gain of the first amplifier 1 supplied with the feedback current is set to be less than 5% with respect to the second amplifier 2, the improvement of the irregularity of rotation of the brushless motor 200 is small. When the gain of the first amplifier 1 is set to be larger than 20% with respect to the second amplifier 2, a bias voltage of the feedback amplifier 6 becomes a limit of the bias range, and the dynamic range thereof becomes small. Thus, the gain increase thereof is preferable to be within 20% with respect to the second amplifier 2. As a result of this embodiment, the irregularity of rotation relates to the difference between the amplitude controlled Hall signal U3 and the amplified Hall signal V2 versus the amplified Hall signal V2 as shown in FIG. 22.

In the embodiments above, a feedback amplifier 6 is used for the brushless motor of the present invention, and a feed forward amplifier may also be used instead of the feedback amplifier 6. Further, an axial gap type brushless motor is used in the embodiments, but a radial gap type brushless motor may be used instead. Moreover, the drive magnet of the brushless motor of the present invention is made to be a single body of magnet which radiates magnetic flux to both of the stator coils and the Hall elements, however, 2 separate drive magnets which radiate magnetic fluxes respectively to the stator coils and the Hall elements may be used.

An advantage of the present invention of a brushless motor driving system is to improve an irregularity of rotation and productivity of the brushless motor by detecting and equalizing the difference between the amplified Hall signals U2 and V2 by feeding back the source current to one of the amplifiers, obtaining a composite signal W3 by compounding the amplitude controlled Hall signal U3 and the amplified Hall signal V2.

Another advantage of the present invention is to obtain three phases of drive signals by compounding the two Hall signals.

Further and another advantage of the present invention is to provide a brushless motor having a small irregularity of rotation by setting a gain of one of amplifiers for amplifying Hall signals U1 and V1 by at least 5% larger than that of another amplifier, which means that a ratio of a ripple contained in a feed back current to the feed back current is small.

What is claimed is:

1. A motor driving system for a brushless motor comprising:

a drive magnet;

a rotor provided with said drive magnet;

3-phase stator coils provided on a substrate and facing said drive magnet;

two Hall elements exposed to magnetic fluxes of said drive magnet and outputting first and second Hall signals having a 120 degrees phase difference therebetween;

amplitude control means for equalizing said first and second Hall signals by adjusting either amplitude or both amplitudes of said first and second Hall signals so as to remove an amplitude difference between said first and second Hall signals and for outputting said equalized first and second Hall signals;

signal compounding means for generating a compound signal, wherein said signal compounding means contains adding means for adding said equalized first and second Hall signals together and nonlinear means having a conversion characteristic of triangular wave to trapezoidal wave, for converting an output signal from said adding means into a waveform equivalent to said first and second Hall signals; and drive circuit means for switching drive currents to be supplied to said 3-phase stator coils in response to said equalized first and second Hall signals and said compound signal.

2. A motor driving system for a brushless motor comprising:

a drive magnet;

a rotor provided with said drive magnet;

3-phase stator coils provided on a substrate and facing said drive magnet;

two Hall elements exposed to magnetic fluxes of said drive magnet and outputting first and second Hall signals having a 120 degrees phase difference therebetween;

amplitude control means for equalizing an amplitude difference between said first and second Hall signals for outputting equalized first and second Hall signals, wherein said amplitude control means has first and second differential amplifiers, said first differential amplifier is supplied with a source current which controls a gain of said first differential amplifier for equalizing amplitudes of said first and second Hall signals, further, the gain of said first differential amplifier supplied with the source current is set to be at least 5% smaller than that of the second differential amplifier;

signal compounding means for compounding said equalized first and second Hall signals together and outputting a compound signal; and drive circuit means for switching drive currents to be supplied to said 3-phase stator coils in response to said equalized first and second Hall signals and said compound signal.

3. A motor driving system for a brushless motor comprising:

a drive magnet;

a rotor provided with said drive magnet;

3-phase stator coils provided on a substrate and facing to said drive magnet;

two Hall elements exposed to magnetic fluxes of said drive magnet and outputting first and second Hall signals having a 120 degrees phase difference therebetween;

signal compounding means including adding means for adding said first and second Hall signals together and non-linear converting means for reforming a waveform of an added result of said first and second Hall signals for producing a compound signal;

a drive circuit means for switching drive currents to be supplied to said 3-phase stator coils in response to said first and second Hall signals and said compound signal; and said drive magnet generating a waveform of magnetic flux distribution in a form of trapezoid containing a fundamental wave, a third harmonic wave, and a fifth harmonic wave, and a difference in content between said third harmonic wave and said fifth harmonic wave being smaller than 16%.

4. A motor driving system for a brushless motor claimed in claim 3, wherein said drive circuit means calculates a difference between said first and second Hall signals, another difference between said first Hall signal and said compound signal, and further difference between said second Hall signal and said compound signal, and switches said drive currents responsive to said difference, said another difference and said further difference.

5. A motor driving system for a brushless motor claimed in claim 3, wherein a physical angular distance between said two Hall elements with respect to a center of said rotor is less than 60 degrees.

6. A motor driving system for a brushless motor claimed in claim 3, wherein said two Hall elements are GaAs Hall elements.

7. A motor driving system for a brushless motor comprising:

a drive magnet;

a rotor provided with said drive magnet;

3-phase stator coils provided on a substrate and facing said drive magnet;

two Hall elements exposed to magnetic fluxes of said drive magnet and outputting first and second Hall signals having a 120 degrees phase difference therebetween;

amplitude control means for equalizing an amplitude difference between said first and second Hall signals and for outputting equalized first and second Hall signals;

signal compounding means for compounding said equalized first and second Hall signals together and outputting a compound signal; and drive circuit means for switching drive currents to be supplied to said 3-phase stator coils in response to said equalized first and second Hall signals and said compound signal, and wherein said drive circuit means calculates a difference between said first and second Hall signals, another difference between said first Hall signal and said compound signal, and further difference between said second Hall signal and said compound signal, and switches said drive currents responsive to said difference, said another difference and said further difference.

8. A motor driving system for a brushless motor comprising:

a drive magnet, wherein a part of said drive magnet generates a waveform of magnetic flux distribution in a form of a trapezoid containing a fundamental wave, a third harmonic wave, and a fifth harmonic wave, and a difference in content between said third harmonic wave and said fifth harmonic wave being smaller than 16%;

a rotor provided with said drive magnet;

3-phase stator coils provided on a substrate and facing said drive magnet;

two Hall elements exposed to magnetic fluxes of said drive magnet and outputting first and second Hall signals having a 120 degrees phase difference therebetween;

amplitude control means for equalizing an amplitude difference between said first and second Hall signals and for outputting equalized first and second Hall signals, signal compounding means for compounding said equalized first and second Hall signals together and outputting a compound signal; and drive circuit means for switching drive currents to be supplied to said 3-phase stator coils in response to said equalized first and second Hall signals and said compound signal.

9. A motor driving system for a brushless motor comprising:

a drive magnet;

a rotor provided with said drive magnet;

3-phase stator coils provided on a substrate and facing said drive magnet;

two Hall elements exposed to magnetic fluxes of said drive magnet and outputting first and second Hall signals having a 120 degrees phase difference therebetween, wherein a physical angular distance between said two Hall elements with respect to a center of said rotor is less than 60 degrees;

amplitude control means for equalizing an amplitude difference between said first and second Hall signals and for outputting equalized first and second Hall signals;

signal compounding means for compounding said equalized first and second Hall signals together and outputting a compound signal; and drive circuit means for switching drive currents to be supplied to said 3-phase stator coils in response to said equalized first and second Hall signals and said compound signal.

10. A motor driving system for a brushless motor comprising:

a drive magnet;

a rotor provided with said drive magnet;

3-phase stator coils provided on a substrate and facing said drive magnet;

two Hall elements exposed to magnetic fluxes of said drive magnet and outputting first and second Hall signals having a 120 degrees phase difference therebetween, wherein said two Hall elements are GaAs Hall elements;

amplitude control means for equalizing an amplitude difference between said first and second Hall signals and for outputting equalized first and second Hall signals;

signal compounding means for compounding said equalized first and second Hall signals together and outputting a compound signal; and drive circuit means for switching drive currents to be supplied to said 3-phase stator coils in response to said equalized first and second Hall signals and said compound signal.

* * * * *